2,995,548
HYDROLYSIS OF POLYVINYL ACETATE
John E. Bristol, Lewiston, N.Y., assignor to E. I. du Pont de Nemours and Company, Wilmington, Del., a corporation of Delaware
No Drawing. Filed Oct. 8, 1957, Ser. No. 688,841
2 Claims. (Cl. 260—91.3)

This invention relates to the hydrolysis of polymeric esters and more particularly to the hydrolysis of polyvinyl acetate in aqueous medium.

Various methods for the hydrolysis of polymeric esters are known, but all of them suffer from one or more disadvantages among which some are particularly serious, especially when polyvinyl alcohol is produced from a polyvinyl ester such as polyvinyl acetate.

Polyvinyl acetate has been hydrolyzed in water suspension, in bead form, or as an emulsion with particles smaller than 10 microns by means of acid catalysts such as sulfuric acid, hydrochloric acid and perchloric acid. However, with all these acids there is marked discolorization and insolubilization of the resultant polyvinyl alcohol when temperatures above 100–110° C. are used. Furthermore, all these acids are extremely corrosive to the usual materials of construction.

Another disadvantage, which for some uses for polyvinyl alcohol is at times very serious, is the fact that the usual acid catalysts and their salts are non-volatile and thus add to the non-volatile solids content to an undesirable extent. Such catalysts and their salts can be removed only by subjecting the polyvinyl alcohol to an expensive secondary treatment such as filtration, precipitation or ion exchange.

It is accordingly an object of the present invention to provide a process for the aqueous hydrolysis of polyvinyl acetate which has improved characteristics over those associated with the usual strong-acid hydrolysis catalyst such as; volatility sufficient to be removable at about the boiling temperature of water from the aqueous solution, decrease or eliminate the formation of discolored products during alcoholysis, especially at alcoholysis temperature above 100° C. and up to about 150° C.; decrease the corrosiveness of the aqueous hydrolysis medium and greatly minimize or avoid the formation of insolubilized polyvinyl alcohol products.

These and other objects of the invention are made possible by the discovery that sulfur dioxide can be used as an efficient hydrolysis catalyst for the aqueous hydrolysis of polyvinyl acetate. The sulfur dioxide, probably in the form of sulfuric acid, can be used at temperatures up to 140 to 150° C. without producing colored or insolubilized products. The sulfurous acid is markedly less corrosive to materials of construction than the acids used heretofore.

It was further found that when dodecyl benzene sulfonic acid is combined with sulfurous acid the rate of hydrolysis of the polyvinyl acetate is much more rapid than when either agent is used alone, and this effect is synergistic rather than additive. The dodecyl benzene sulfonic acid by itself is not very effective as a hydrolysis agent.

The outstanding advantage of $SO_2$ or its aqueous equivalent, $H_2SO_3$, as a catalyst for the hydrolysis of polyvinyl acetate is that products free of acid catalyst or salts of the acid can be easily obtained without expensive aftertreatment. And even a synergistic catalyst consisting of $SO_2$ and dodecyl benzene sulfonic acid can also be used to advantage in this respect inasmuch as it is possible with dodecyl benzene sulfonate, or more specifically its sodium salt, to obtain a product containing only the sulfonate as an impurity. For many purposes the sulfonic acid or its salt is not deleterious since it has utility as a wetting agent which needs to be added in any case in many final appliactions of polyvinyl alcohol.

Example 1

Approximately 15 gm. of polyvinyl acetate in bead form composed of particles between about 20 mesh and 100 mesh was placed in a glass Carius tube of about one inch diameter and ten inches long. The tube was also charged with 9 grams of a water solution containing 8% by weight of $SO_2$, as well as 1.6 grams of a 10% solution of "Nacconol" NRSF (a commercial form of dodecyl benzene sulfonic acid) in water and 26 grams of distilled water. The Carius tube thus charged at room temperature was sealed and then heated in a glycerol bath at 140° C. for two hours. The tube was then quickly cooled and contained a uniform, clear, colorless solution which, by analysis, was shown to contain polyvinyl alcohol resulting from the hydrolysis of polyvinyl acetate to the extent of 96%. The $SO_2$ present in the hydrolysis mixture was equivalent to 2% by weight of the total water content and the sulfonic acid was equivalent to 0.5% of all the water.

Example 2

This example was a duplicate of Example 1 in all respects except that in place of $SO_2$ there was used 1% of sulfuric acid by weight based on the water content, and the sulfonic acid amounted to 0.25% by weight of all the water present. The resulting product was a black insoluble resin which had precipitated from the hydrolysis medium. The degree of hydrolysis of the product was about 97%.

Example 3

This example in composition exactly duplicated Example except that the temperature of hydrolysis was at 100° C. for 10 hours instead of 140° C. for two hours. The product in this case was a light yellow, clear solution of polyvinyl alcohol of a degree of hydrolysis of 96%.

Example 4a

This example was an exact duplicate of Example 1 except that no dodecyl benzene sulfonic acid was used. The product was a uniform, clear, colorless solution, but the degree of hydrolysis was only 80%. After removal from the sealed tube, the solution was heated at atmospheric pressure at 100° C. for a few minutes which was sufficient to remove all the $SO_2$. On adding acetone to the solution, a white powder precipitated.

Example 4b

This example was a duplicate of Example 4a except that hydrolysis at 140° C. was continued for 4 hours instead of two hours and the product was equally good, but the degree of hydrolysis was 96%. All the $SO_2$ was removed by heating the product solution removed from the sealed pressure tube for a few minutes at 100° C. and atmospheric pressure. No trace of sulfurous acid could be found. On adding acetone to this solution, a white powder was precipitated.

Example 5

This example is a duplicate of Example 1 except that hydrolysis was effected at 100° C. for a period of 10 hours instead of 140° C. for two hours. The product was a clear, colorless solution and represented polyvinyl alcohol of a degree of 96% hydrolysis.

Example 6

This was a repetition of Example 3 except that the hydrolysis mixture was heated for 20 hours at 100° C. instead of 10 hours at 140° C. The product was a clear, colorless solution of 90% hydrolyzed polyvinyl alcohol.

*Example 7*

This example was a repetition of Example 3 except that the sulfuric acid was replaced by 1% hydrochloric acid by weight related to the water and the mixture was heated in the pressure tube at 140° C. for two hours. A black insoluble gel was formed which, by determination of the acetic acid, formed indicated a degree of hydrolysis of 96%.

*Example 8*

This was a duplicate of Example 7 except that the mixture was heated for 20 hours at 100° C. The product was a clear, light yellow solution containing a polyvinyl alcohol of a degree of hydrolysis of 95%.

Sulfur dioxide can be used alone in the aqueous hydrolysis of polyvinyl acetate at temperatures up to 150° C. without producing a discolored or water insoluble product, but it is preferred to use, where possible, a small addition of dodecyl benzene sulfonic acid or its equivalent. The amount on a weight basis of sulfurous acid as $SO_2$ may vary from 0.5 to 10% based on the polyvinyl acetate to be hydrolyzed, but the preferred concentration lies between 1 and 4%.

Hydrolysis with sulfurous acid must be conducted under conditions which will prevent the volatilization of $SO_2$ from the mixture. This will require that the process be conducted in apparatus capable of withstanding the pressure generated by water and sulfur dioxide heated to about 150° C. and higher, and this will be within a pressure range of not over about 200 pounds per square inch.

The hydrolysis time required may vary depending upon the concentration of the hydrolysis catalyst as well as upon the temperature. Generally, a shorter time of heating is required if the temperature is high and the same relation holds if the acid concentration is high. Generally, at least one hour will be required to achieve hydrolysis at a temperature above 100° C. and as long as 10 hours may be required if the catalyst concentration is below about 0.3% at the same temperature. At a temperature of about 140° C. a time of 2 hours is generally sufficient for practically complete hydrolysis at a concentration of $SO_2$ of about 2.0% together with 25% by weight of the $SO_2$ of dodecyl benzene sulfonate.

A ratio of $SO_2$ to dodecyl benzene sulfonic acid of about 3:1 to 5:1 on a weight basis is preferred for the maximum synergistic effect. Ratios which vary to the extent of 8:1 to 1:1 are less effective.

The amount of water to be used in the hydrolysis may vary over a wide range and is not critical. Generally, it will be preferred to use at least twice as much water by weight as polyvinyl acetate.

Since polyvinyl acetate is insoluble in water, it is important that it be of a particle size not too large. An emulsion of the polymer may be used or it may be in bead form with a particle size preferably below 20 mesh. Particles of polyvinyl acetate larger than 20 mesh will generally require too long for aqueous hydrolysis to be practical.

I claim:

1. In the hydrolysis of polyvinyl acetate to polyvinyl alcohol, the step comprising heating at between about 100 and 150° C., a mixture of polyvinyl acetate, water and 0.5 to 10% by weight of said polyvinyl acetate of sulfur dioxide, said polyvinyl acetate having a particle size smaller than 20 mesh and the heating step being conducted in a closed vessel at the pressure generated by the water and sulfur dioxide at the hydrolysis temperature.

2. In the hydrolysis of polyvinyl acetate to polyvinyl alcohol, the step comprising heating at between about 100 and 150° C., a mixture of polyvinyl acetate, water, and 0.5 to 10% by weight of said polyvinyl acetate of sulfur dioxide, and dodecyl benzene sulfonic acid, said polyvinyl acetate having a particle size smaller than 20 mesh, said sulfur dioxide and dodecyl benzene sulfonic acid being present in a ratio of about 3:1 to 5:1 on a weight basis and the heating step being conducted in a closed vessel at the pressure generated by the water and sulfur dioxide at the hydrolysis temperature.

References Cited in the file of this patent

UNITED STATES PATENTS

| | | |
|---|---|---|
| 2,629,713 | Goebel | Feb. 24, 1953 |
| 2,642,420 | Kenyon et al. | June 16, 1953 |
| 2,703,794 | Roedel | Mar. 8, 1955 |

OTHER REFERENCES

Groggins: Unit Processes in Organic Synthesis, 4th ed., published 1952, McGraw-Hill Book Co. Inc., New York, N.Y.

UNITED STATES PATENT OFFICE
CERTIFICATE OF CORRECTION

Patent No. 2,995,548                                      August 8, 1961

John E. Bristol

It is hereby certified that error appears in the above numbered patent requiring correction and that the said Letters Patent should read as corrected below.

Column 1, line 50, for "sulfuric" read -- sulfurous --; column 2, line 2, for "appliactions" read -- applications --; lines 34 and 35, after "Example" insert -- 2 --; column 4, line 44, after "4th ed.," insert -- page 654, --.

Signed and sealed this 2nd day of January 1962.

(SEAL)
Attest:

ERNEST W. SWIDER
Attesting Officer

DAVID L. LADD
Commissioner of Patents
USCOMM-DC